United States Patent [19]

Cordell et al.

[11] Patent Number: 4,691,846
[45] Date of Patent: Sep. 8, 1987

[54] METHOD AND APPARATUS FOR GASIFYING SOLID ORGANIC MATERIALS

[76] Inventors: Henry L. Cordell, 795 Gordon Rd.; David G. Galer, 1657 Mapes Rd., both of Mio, Mich. 48647

[21] Appl. No.: 743,529

[22] Filed: Jun. 11, 1985

[51] Int. Cl.⁴ .............................................. G01F 11/20
[52] U.S. Cl. .................................... 222/198; 222/233; 222/413
[58] Field of Search .............................. 366/184, 333; 222/198–200, 233–234, 409–410, 413, 269, 275, 280, 232

[56] References Cited

U.S. PATENT DOCUMENTS

| 1,300,441 | 4/1919 | Morsa | 222/280 X |
| 2,740,561 | 4/1956 | Coffman, Jr. | 222/409 |
| 4,498,635 | 2/1985 | Fielding | 241/94 |

FOREIGN PATENT DOCUMENTS

| 926666 | 5/1963 | United Kingdom | 222/199 |
| 569512 | 9/1977 | U.S.S.R. | 222/232 |

Primary Examiner—Joseph J. Rolla
Assistant Examiner—Michael S. Huppert
Attorney, Agent, or Firm—Remy J. VanOphem

[57] ABSTRACT

A heating system for producing heat by the gasification of solid, organic biomass materials. A mass of such materials is maintained on a grate in a primary oxidation chamber of the catalytic type, and materials in such mass are gradually heated in a deficiency of oxidation for full oxidation of such materials to produce a gaseous, combustible effluent. The gaseous combustible effluent is transferred to a secondary oxidation chamber where it is further oxidized to a fully oxidized state by burning. The gaseous effluent from the secondary oxidation chamber is used as a heat source for a water tube boiler. A storage hopper is provided to store the biomass feed materials for delivery to the primary oxidation chamber. The bottom of the storage hopper is inverted and reciprocating plates are provided along the bottom of the storage hopper. The reciprocation of the reciprocating plates helps to keep the biomass feed materials in the storage hopper from bridging or compacting to promote the smooth flow of feed materials through the hopper.

10 Claims, 6 Drawing Figures

METHOD AND APPARATUS FOR GASIFYING SOLID ORGANIC MATERIALS

BACKGROUND OF THE INVENTION

This invention relates to a method and apparatus for gasifying solid organic materials to convert the chemical energy stored in such materials to thermal energy. More particularly, this invention relates to a method and apparatus for gasifying biomass materials such as wood chips, sawdust, corn cobs, bagasse, tobacco waste and the like. The invention utilizes a new and improved feed hopper with inclined reciprocating plates lying along the bottom of the feed hopper to prevent the feed material from jamming in the hopper, even when the feed stock is moist and/or irregularly or nonuniformly shaped, and it utilizes a domed catalytic oxidation chamber where the feed stock is partially oxidized at an elevated temperature. The high temperature gases produced by the practice of the invention can be utilized to advantage, for example, as the thermal energy source for a conventional water tube boiler.

DESCRIPTION OF THE PRIOR ART

It has long been recognized that many industrial and agricultural solid organic by-products, such as wood chips, sawdust, corn cobs, bagasse, tobacco waste, and the like, contain large amounts of chemical energy. The substantial increases in the cost of traditional fuels, such as fuel oil and natural gas, which took place during the 1970's, have provided substantial economic incentive to try to develop effective and efficient techniques for recovering the energy in these organic by-products, energy that traditionally was not recovered to any substantial extent. Such organic materials, which are frequently referred to as "biomass" materials, are now successfully utilized to some extent as fuel in some very large industrial systems, for example, in firing the recovery boiler in a pulp or paper mill. However, the high capital cost which has heretofore been associated with biomass energy recovery systems has precluded their successful use in small or even medium size energy recovery systems. Medium size energy recovery systems, viz, of the size from about 4,000,000 to 8,000,000 BTU/Hr., are used in schools, nursing homes, and small industrial and commercial establishments and, to date, biomass fuels have not been satisfactorily utilized as fuel in heating systems for such facilities. Among the U.S. Patents that have been issued on inventions relating to the recovery of energy from wood chips or similar organic materials are U.S. Pat. No. 4,184,436, to Palm, et al.; U.S. Pat. No. 4,312,278, to Smith, et al.; U.S. Pat. No. 4,366,802, to Goodine; U.S. Pat. No. 4,321,877, to Schmidt, et al.; and U.S. Pat. No. 4,430,948, to Ekenberg. However, it is not known that any of the inventions described in these patents have been successfully adapted to recovering biomass energy on a cost-effective basis in small and medium size energy recovery system.

SUMMARY OF THE INVENTION

In accordance with the present invention, there is provided a relatively simple method and apparatus for the recovery of energy from biomass materials by the gasification of such materials. The method and apparatus according to the present invention can be utilized on a cost-effective basis, due to the relatively low capital cost of the apparatus, to cleanly and efficiently recover energy at medium rates of recovery, and even at low rates of recovery, for example, approximately 100,000 BTU/Hr., rates which typically are those needed in home heating units. The apparatus according to this invention utilizes a domed catalytic oxidation chamber where the biomass feed stock is partially oxidized slowly in a process in which it first chars, preferably in a deficiency of oxygen, producing a high temperature combustible effluent which is burned in a secondary oxidation chamber, and the effluent from the secondary oxidation chamber can be utilized as a thermal energy source, for example, in an otherwise conventional water tube boiler as a substitute for the effluent from the fuel oil or gas burner that is normally utilized in conjunction with a boiler of such type.

During normal operation, the biomass feed stock is mechanically fed to the domed catalytic oxidation chamber from a storage hopper by means of a screw feeding system, preferably automatically in response to the demand for energy from the system. The feed hopper has a generally inwardly and downwardly tapered bottom, and reciprocating plates extend along the inwardly and downwardly tapering bottom plates of the hopper to help feed the biomass feedstock into the screw feeding system and the help keep the feedstock from clogging up or "bridging" in the hopper due to the high moisture content of many of such biomass feedstock materials and/or the irregular or nonuniform shape of such materials. The domed catalytic oxidation chamber is provided with a grate system for removing ash and noncombustible contaminants, such as sand, dirt, stones, and rocks from the chamber.

The biomass oxidation method and apparatus according to the present invention can be utilized to particular advantage in remote Northern regions, where winters are long and cold, conventional fuels are expensive and occasionally scarce because of the long delivery distances from remote major population centers, and where biomass feed stocks are plentiful and inexpensive as a result of the agricultural and/or forest-based business activities that are frequently conducted in such regions.

Accordingly, it is an object of the present invention to provide an improved method and apparatus for producing energy by the gasification of organic materials.

More particularly, it is an object of the present invention to provide an improved method and apparatus for efficiently producing energy at relatively low rates by the gasification of organic materials.

It is a further object of the present invention to provide an improved hopper for feeding solid materials into a material handling system.

It is also an object of the present invention to provide an improved catalytic oxidation chamber for at least partially oxidizing solid organic materials.

For a further understanding of the present invention, attention is directed to the drawings and the following description thereof, to the detailed description of the preferred embodiment and to the appended claims.

DETAILED DESCRIPTION OF THE PREFERRED EMBODIMENT

Figure 1:
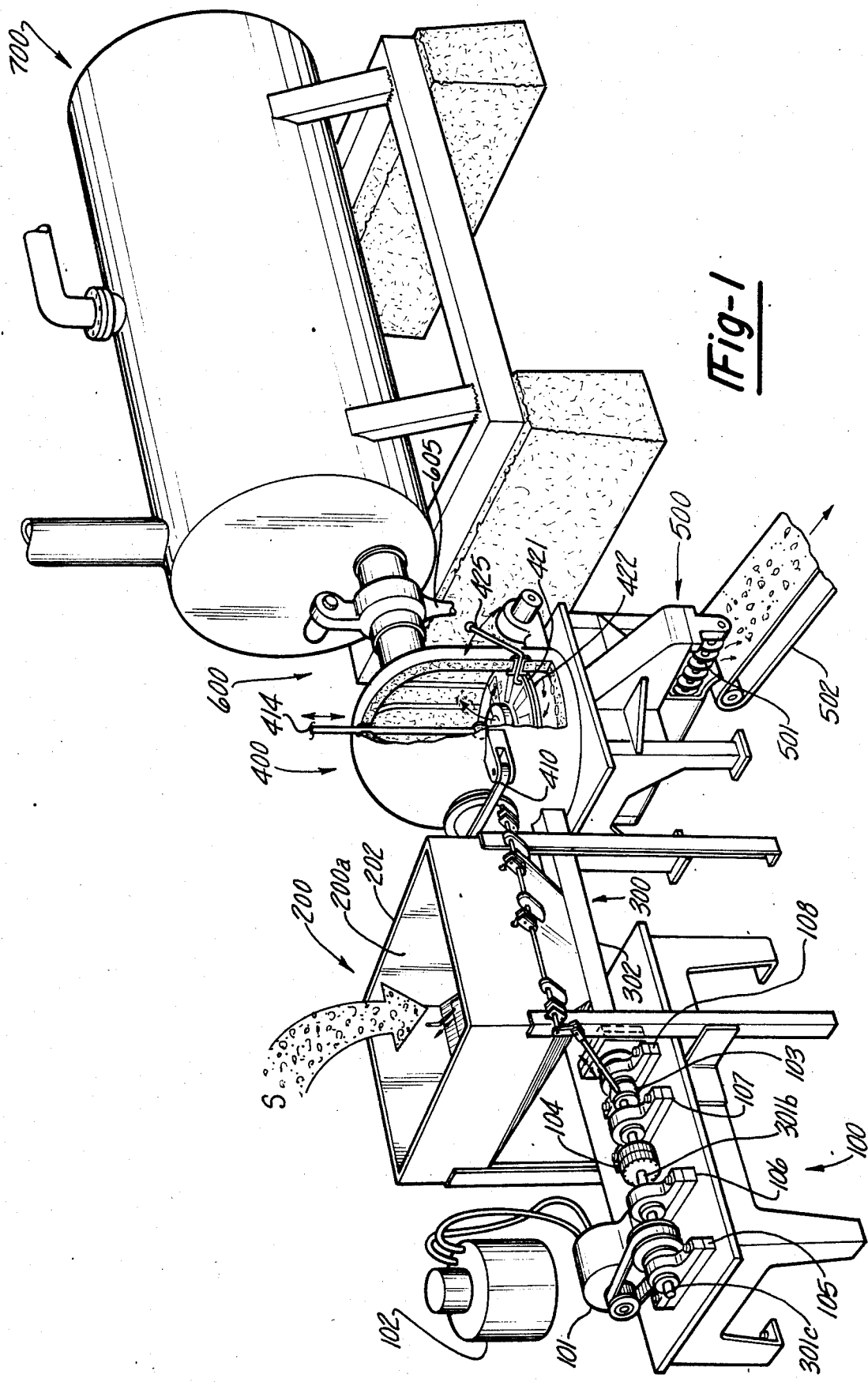
FIG. 1 is a perspective view, partially in section, of an apparatus for gasifying solid organic materials according to the present invention.

As is shown in FIG. 1, an apparatus for practicing the present invention utilizes a drive assembly, indicated generally by reference numeral 100, a storage hopper assembly, indicated generally by reference numeral 200, a feed assembly, indicated generally by reference numeral 300, which is driven by the drive assembly 100 which feeds material from the storage hopper assembly 200 into a primary oxidation chamber of the catalytic type, indicated generally by reference numeral 400. The unoxidized or unburned portion of the feed material fed into the primary oxidation chamber 400 is withdrawn therefrom and transported away by a clean-out assembly, indicated generally by reference numeral 500 and, in the preferred embodiment of the invention, the materials fed into the primary oxidation chamber 400 is only partially oxidized therein, and there is provided a secondary oxidation chamber, indicated generally by reference numeral 600, to complete the oxidation of the partially oxidized feed material, which is now in gaseous form, as it leaves the primary oxidation chamber 400. The fully oxidized gaseous material from the secondary oxidation chamber 600 is used as a source of heat energy in a device which requires heat energy, and in the preferred embodiment of the present invention this takes a form of an otherwise conventional water tube boiler, indicated generally by reference numeral 700.

The material which is to be oxidized in the apparatus of FIG. 1 is delivered to the storage hopper assembly 200 in any suitable manner, for example, manually from a pile of such material or by means of a conveyor, not shown, from a self-unloading truck body of an appropriate type, also not shown, or in any other suitable manner. In FIG. 1 the transfer of the material into the storage hopper assembly 200 is indicated generally by an arrow which is identified by reference letter S.

The feed material which is delivered into the storage hopper assembly 200 may be any of the wide range of solid, organic materials of a type which is frequently referred to as "biomass" materials, and suitable materials of this type include wood chips, sawdust, corn cobs, and bagasse. These materials are usually waste by-product materials from various agricultural or forest-based industrial processes, and contain substantial amounts of chemical energy which is capable of being converted to thermal energy by suitable oxidation processes. Such materials are, however, difficult to handle because they are usually moist and are nonuniform or irregular in shape, and heretofore it has been difficult to efficiently and effectively oxidize such materials because of their high moisture content, their nonuniform chemical composition, and their frequent contamination with non-oxidizable materials, such as sand, dirt, rocks, and stones.

Figure 5:
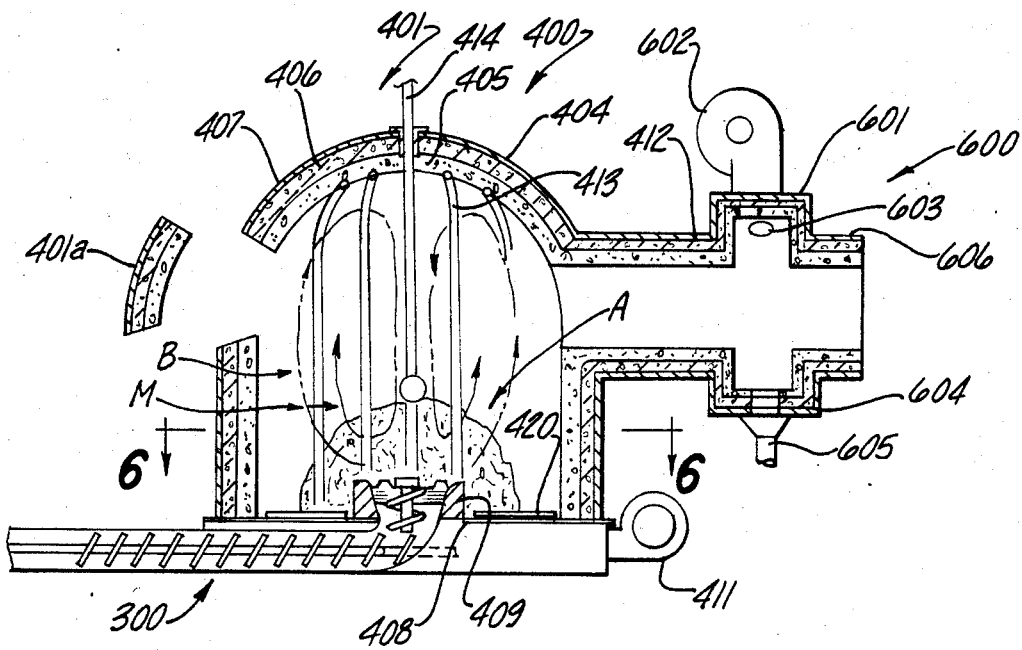
FIG. 5 is a fragmentary elevational view, in section, of another portion of the apparatus depicted in FIG. 1.

As noted above, the feed material from the storage hopper assembly 200 is oxidized to a gaseous state in the primary oxidation chamber 400, preferably to a state which is not fully oxidized. The primary oxidation chamber 400 is defined by a wall 401, and the chamber which is defined by the wall 401 is in the shape of a vertically extending cylinder 402 which has a flat bottom 403 and which opens at its top into an open, downwardly facing hemispherical dome 404. As is shown in FIG. 5, the wall 401 is made up of a multiplicity of layers, the innermost layer 405 of which is a layer of a high-temperature catalytic refractory that is capable of withstanding the elevated temperatures that will develop within the primary oxidation chamber 400, for example, temperatures in the range of approximately 2300° F. to approximately 2500° F., and that is capable of catalytically promoting the oxidation of the biomass feed material that is developed into the primary oxidation chamber 400. A cementitious plastic refractory manufactured by A. P. Green Company under the designation "Super High Bond Cement" has been found to be a satisfactory material for use in forming the innermost layer 405. In addition to the innermost layer 405 of catalyic refractory material, the wall 401 also includes an insulating layer 406 in back of the innermost layer 405 to reduce a loss of heat through the wall 401 of the primary oxidation chamber 400. The insulating layer 406 may be but a single layer of a suitable insulating material, for example, insulating brick or insulating fire brick, or it may be made up of a multiplicity of layers of similar or dissimilar insulating material if it is desired to minimize the transfer of heat through the wall 401 to a degree that cannot be accomplished in a satisfactory manner by means of a single layer of insulating material, all of which is known in the art. In any case, the final layer in the multiplicity of layers in the wall 401 is a structural layer 407 of sheet metal, for example, plate steel, to provide the necessary strength and rigidity for the primary oxidation chamber 400.

The biomass feed material from the storage hopper assembly 200 is introduced into the primary oxidation chamber 400 through an opening 408 in the bottom 403 of the primary oxidation chamber 400, the center of the opening 408 preferably lying along the vertical central axis of the cylinder 402 of the primary oxidation chamber 400. An annular air distributor 409 surrounds the opening 408, and feed material is introduced upwardly through the opening 408 and the annular distributor 409 by means of the feed assembly 300. During normal operating conditions, as is illustrated in FIG. 5, the feed material rises over the top of the annular distributor 409 and it rests on an annular grate, indicated generally by reference numeral 420, until it forms a mass of such material, indicated generally by reference letter M, which is the normal or equilibrium condition of the primary oxidation chamber 400 when it is operational.

To bring the primary oxidation chamber 400 to an operational condition on start up, the feed assembly 300 is activated to develop a mass M of feed material on the annular grate 420. The mass M of feed material is then ignited, for example, manually, a portion 401a of the wall 401 of the primary oxidation chamber 400 being removable from the remaining portion of the wall 401 to facilitate the igniting of the mass M, and/or to permit the inspection and/or cleaning out of the chamber of the primary oxidation chamber 400 when it is nonoperational. To facilitate the removal of the removable portion 401a of the wall 401, the removable portion 401a is mounted on a swing-out arm assembly 410, as is shown in FIG. 1. To facilitate bringing the mass M of feed material up to its normal operating temperature, fuel oil or other readily combustible supplemental fuel can be added to it, and this can be done manually through the opening provided when the removable portion 401a is removed.

The oxidation of the feed material in the primary oxidation chamber 400 requires a source of oxygen, and ambient air has been found to be a suitable source for this purpose. An air blower 411 of standard construction it used to provide ambient air to the primary oxidation chamber 400, the air being introduced into the interior of the mass M of feed material through the annular air distributor 409.

As the feed material in the mass M in the primary oxidation chamber 400 moves from the bottom to the top of the mass, it will get hotter and hotter, and volatile ingredients in such material will begin to dissipate therefrom, being carried away by the air from the blower 411 which is rising through such material. As the feed material in the mass M of feed material loses more and more of its volatile ingredients it will char until, eventually, it is exposed to the full operating temperature inside the primary oxidation chamber 400, at which time all of the organic constituents of such feed material will gasify and will pass from the primary oxidation chamber 400 as an incompletely oxidized gaseous effluent, the effluent leaving the primary oxidation chamber 400 through an insulated exit duct 412.

The oxidation of the feed material in the mass M of the feed material proceeds more satisfactorily if the amount of feed material in the mass M of feed material is maintained at a relatively constant value. To accomplish this, a reciprocable probe 414 is provided extending downwardly into the primary oxidation chamber 400 through the wall 401 to determine the elevation of the top of the feed material in the mass M of feed material. Suitable instrumentation, not shown, is provided to control the rate of the delivery of the feed material into the primary oxidation chamber 400 by the feed assembly 300 as a function of the elevation of the top of the feed material in the mass M of feed material, as measured by the reciprocable probe 414, to maintain such elevation at a substantially constant value, and thereby to contain the mass M of feed material at a substantially constant value. The reciprocable probe 414 is preferably internally cooled, by circulating air or water therethrough, to permit it to function satisfactorily in the high temperature environment of the primary oxidation chamber 400.

The air which is added to the primary oxidation chamber 400 through the annular air distributor 409 appears to repeatedly flow up and down through the mass of feed material M in the primary oxidation chamber 400, as is illustrated by the arrows A and B in FIG. 5, this continuous recirculation of air, which progressively changes in composition to the gaseous oxidized feed material, being facilitated by the hemispherical shape of the dome 404 of the primary oxidation chamber 400. The recirculating effect may be enhanced by channelizing the flow of gaseous material within the primary oxidation chamber 400 by providing a spaced-apart series of vertical, radially inwardly projecting flutes 413 in the wall 401 of the primary oxidation chamber 400. The flutes 413 can be advantageously formed out of metal pipe, for example, 11/4 or 11/2 inches in diameter, and these pipes can be embedded in the innermost layer 405 at the time it is cast, preferably to the extent of approximately one-half of the outside diameter of each of the metal pipes. While the metal pipes that make up the flutes 413 are exposed to the high temperature conditions existing in the primary oxidation chamber 400, it is possible to utilize conventional, low-temperature steel pipe to form such flutes 413 by providing a blower or other means, not shown, to circulate a coolant, such as air or water, through the pipes when the primary oxidation chamber 400 is operational to thereby avoid the need for using expensive, special high temperature alloys in the construction of such flutes 413.

The gaseous effluent leaving the primary oxidation chamber 400 through the insulated exit duct 412 passes into the secondary oxidation chamber 600. The secondary oxidation chamber 600 is defined by an insulated wall 601 and, in the preferred embodiment, the insulated wall 601 is arranged to define a secondary oxidation chamber which is in the form of a cylinder whose longitudinal axis is coextensive with the longitudinal axis of the insulated exit duct 412 of the primary oxidation chamber 400. A secondary oxidant is added to the secondary oxidation chamber 600 to burn or completely oxidize gaseous materials flowing into the secondary oxidation chamber through the insulated exit duct 412 from the primary oxidation chamber 400. Again, ambient air is satisfactory for use as the secondary oxidant and may be provided to the secondary oxidation chamber 600 by means of a second blower 602, again of conventional construction, and preferably the blower 602 is arranged with its outlet 603 entering the secondary oxidation chamber 600 in a direction which is tangential to the wall 601 which defines the secondary oxidation chamber 600. A swirling or cyclonic action will develop within the secondary oxidation chamber 600 by virtue of the tangential admission of secondary air through the blower outlet 603, and any solid particles which are carried into the secondary oxidation chamber 600 will be driven to the outermost portions of the secondary oxidation chamber 600 by centrifugal force resulting from this swirling action and may be readily removed from the secondary oxidation chamber by means of a radial port 604 at the bottom of the secondary oxidation chamber 600. Solid particles leaving the secondary oxidation chamber 600 through the radial port 604 are collected and taken away to a storage and disposal location, not shown, by means of a collector 605, shown fragmentarily and schematically. Sufficient air is added to the secondary oxidation chamber 600 by means of the second blower 602 to fully oxidize the partially oxidized gaseous materials entering the secondary oxidation chamber 600 from the insulated exit duct 412 of the primary oxidation chamber 400 and, preferably, excess air is added to the secondary oxidation chamber 600 to prevent excessively high temperatures from developing therein.

In the preferred operation of the apparatus according to the present invention, the temperature in the secondary oxidation chamber 600 should be limited to no more than approximately 2800° F., and this can be done by utilizing total air added to the system, including the air added to the primary oxidation chamber 400 by the air blower 411 and the air added to the secondary oxidation chamber 600 by the second blower 602, in an amount which equals approximately 150% of that required for full oxidation of the feed material added to the primary oxidation chamber 400. The fully oxidized, high-temperature gaseous material from the secondary oxidation chamber 600 exits from the secondary oxidation chamber 600 as an effluent through a second insulated duct 606 and passes into the water tube boiler 700, which may be considered to be of otherwise conventional construction, to be used as the source of heat for water flowing through tubes in such water tube boiler 700, as a substitute for the effluent from an oil or gas burner that is usually used in conjunction with such water tube boiler 700 as the source of heat therefor.

Figure 6:
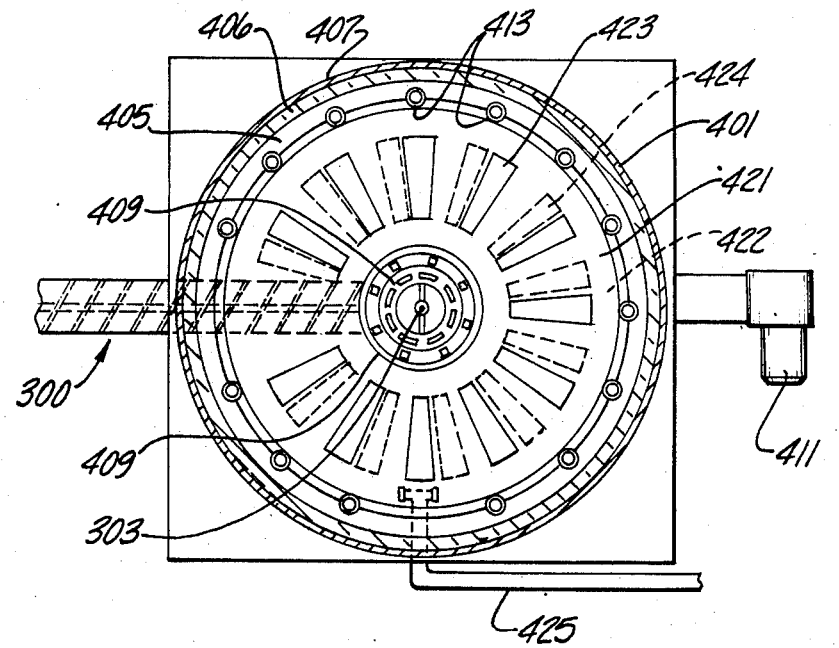
FIG. 6 is a sectional view taken along lines 6—6 of FIG. 5.

The annular grate 420 of the primary oxidation chamber 400 is made up of a first annular plate member 421 and a second annular plate member 422, with the first annular plate member 421 being superimposed on the second annular plate member 422. The first annular plate member 421 is provided with a spaced-apart series of radially extending slots 423 and the second annular plate member 422 is provided with a spaced-apart series of radially extending slots 424. The radially extending slots 424 in the second annular plate member 422 are normally offset with respect to the radially extending slots 423 in the first annular plate member 421, as is shown in FIG. 6. In this condition, neither the feed material in the primary oxidation chamber 400 nor any contaminants therein will be able to exit from the primary oxidation chamber 400 through the radially extending slots 423 of the first annular plate member 421. However, the first annular plate member 421 is mounted so as to be rotatable through a limited arc with respect to the second annular plate member 422, and a handle 425 is provided to manually effect such rotation on a periodic basis, as desired. The rotation of the first annular plate member 421 with respect to the second annular plate member 422 by means of the handle 425 is effective to bring the radially extending slots 423 in the first annular plate member 421 into alignment with the radially extending slots 424 in the second annular plate member 422. When this happens, any nonoxidizable materials which were in the original feed material, and which normally work their way to the bottom of the mass M of such feed material as the oxidation process continues, can exit from the primary oxidation chamber 400 through the aligned radially extending slots 423 and 424, by gravity, assisted to some extent by the vibration resulting from the rotation of the first annular plate member 421. These withdrawn materials are received in the clean-out assembly 500 which is disposed beneath the primary oxidation chamber 400, and they may be automatically withdrawn from the clean-out assembly 500 by means of a screw conveyor 501 associated therewith, to be deposited on a take-out conveyor 502, shown fragmentarily. Where desired, of course, the periodic partial rotation of the first annular plate member 421 with respect to the second annular plate member 422 may be mechanically actuated, for example, by means of a hydraulic system or a pneumatic system, not shown, and the removal of the withdrawn materials from the clean-out assembly 500 may be done manually rather than mechanically as illustrated.

Figure 2:
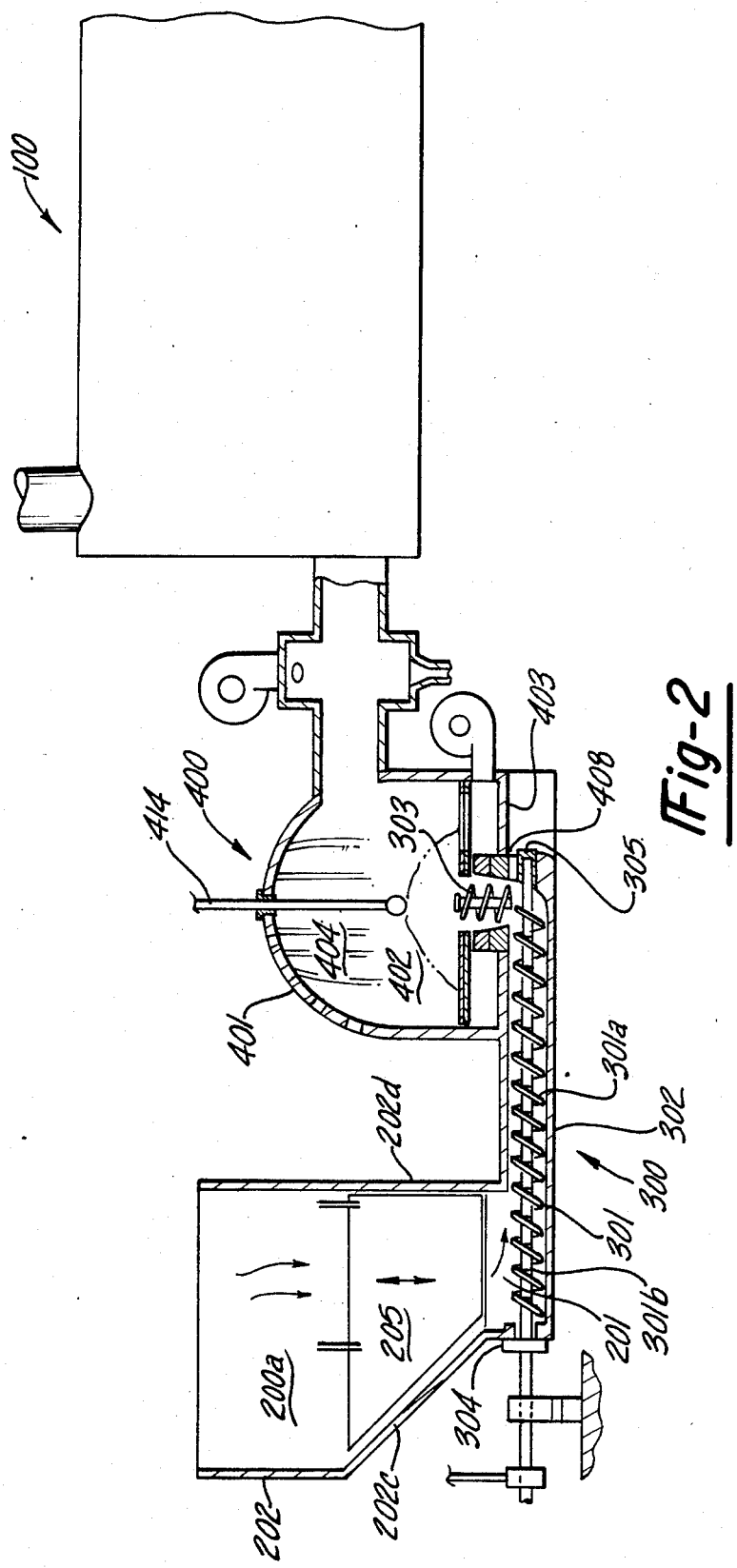
FIG. 2 is a fragmentary elevational view, in section, of a portion of the apparatus depicted in FIG. 1.
Figure 3:
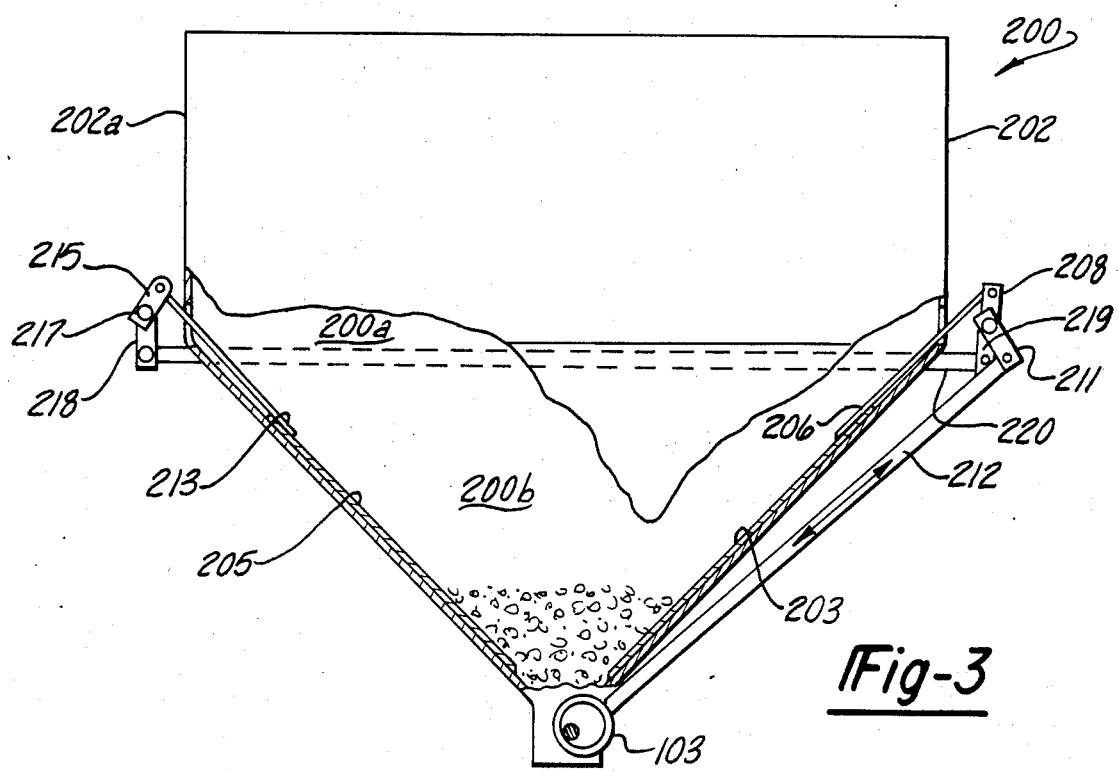
FIG. 3 is a fragmentary elevational view, partially in section and at an enlarged scale, of a portion of the apparatus depicted in FIGS. 1 and 2.

The storage hopper assembly 200, which will subsequently be described in detail, has an elongate opening 201 in the bottom thereof, and the elongate opening 201 is longitudinally aligned with a horizontal screw member 301 of the feed assembly 300, with the horizontal screw member 301 being disposed immediately below the elongate opening 201 of the storage hopper assembly 200. The feed assembly 300 also includes a tubular housing 302 which surrounds the horizontal screw member 301, except the portion of the horizontal screw member 301 which is in communication with the elongate opening 201 of the storage hopper assembly 200. The horizontal screw member 301 of the feed assembly 300 is normally rotated by the drive assembly 100, which will subsequently be described in detail, to advance the feed material from the storage hopper assembly 200 through the tubular housing 302 to the primary oxidation chamber 400. Preferably, as is shown in FIG. 2, the feed assembly 300 also utilizes a second or vertical screw member 303, which is disposed in a vertical position and which serves to vertically transfer feed material from the end of the horizontal screw member 301 upwardly into the primary oxidation chamber 400. Preferably, the tubular housing 302 of the feed assembly 300 is rectangular in its cross-sectional configuration, so that the feed material being advanced therethrough by the horizontal screw member 301 is constantly experiencing a change in the thickness of the passage through which it is traveling. It has been found that this arrangement is useful in preventing the jamming of feed material within the tubular housing 302, a phenomenon which can occur if the feed material is unusually moist, or otherwise inclined by its shape or composition to "ball-up".

The horizontal screw member 301 has a horizontal screw 301a which is arranged on a shaft 301b. The shaft 301b is journalled in a first bearing 304 which is disposed outboard of the elongate opening 201 of the storage hopper assembly 200 and a second bearing 305 which is disposed at the juncture of the horizontal screw member 301 and a vertical screw member 303. The shaft 301b of the horizontal screw member 301 extends into the drive assembly 100 where it is rotatably driven by means of a hydraulic drive motor 101 that receives pressurized hydraulic fluid from a hydraulic reservoir 102 of conventional construction. The drive assembly 100 also includes a cam bearing 103 which is caused to rotate eccentrically when the shaft 301b of the horizontal screw member 301 is rotated by the hydraulic motor 101, for purposes which will be subsequently described. If it is desired to prevent the imposition of excessive torque on the shaft 301b of the horizontal screw member 301, an outermost portion 301c of the shaft 301b may be separated from the remainder thereof, and the separated portions may be connected to one another by means of a torque-limiting coupling 104 of the drive assembly 100. Spaced-apart bearing members 105 and 106 are provided to rotatably support the outermost portion 301c of the shaft 301, and another bearing member 107, which is spaced-apart from the bearing member 106 and from the bearing member 201, is provided to rotatably support the shaft 301b, in conjunction with the first and second bearings 304 and 305 of the feed assembly 300. As shown, the torque limiting coupling 104 is mounted between the bearing members 106 and 107 and the cam bearing 103 is mounted between the bearing member 107 and the first bearing 304 of the feed assembly 300.

The storage hopper assembly 200 is defined by a sheet steel or similar wall 202 that forms an open top parallelepiped upper section 200a of the storage hopper assembly 200 and an upwardly facing inverted lower section 200b. The lower section 200b commences at the bottom of the upper section 200a and extends downwardly therefrom, terminating in the elongate opening 201 above a portion of the horizontal screw member 301 as previously described. The upper section 200a of the storage hopper assembly 200 is defined by an upper rectangular portion 202a of the wall 202, and the lower section 200b of the hopper assembly is defined by a series of trapezoidal portions 202*b*, 202*c*, and 202*d* arranged end to end in a U-shaped pattern, and by an end wall portion 202*e*. The end wall portion 202*e* closes the end between the trapezoidal portions 202*b* and 202*d* that is opposed to the end that is closed by the trapezoidal portions 202*c*.

The feed material from source S flows downwardly through the storage hopper assembly 200 by gravity, and exits into the feed assembly 300 through the elongate opening 201 to be carried into the primary oxidation chamber 400 by the feed assembly 300, as heretofore described. The flow of the feed material through the storage hopper assembly 200 is, however, subject to compaction or bridging within the storage hopper assembly 200 by virtue of the high moisture content which, at least occasionally, is characteristic of many biomass feed materials and/or by virtue of the irregular or nonuniform shape of many of such materials. When such compaction or bridging occurs, the flow of feed material through the storage hopper assembly 200 may no longer proceed properly, thereby disrupting the proper operation of the apparatus. Conventional anti-bridging techniques, such as vibrators mounted externally to the storage hopper assembly 200 on the wall 202, and vibrating rods extending through the storage hopper assembly 200 have been tried, but these were found to be unsatisfactory in their consistency and occasionally even appeared to aggravate the problem by further compacting the feed materials.

Figure 4:
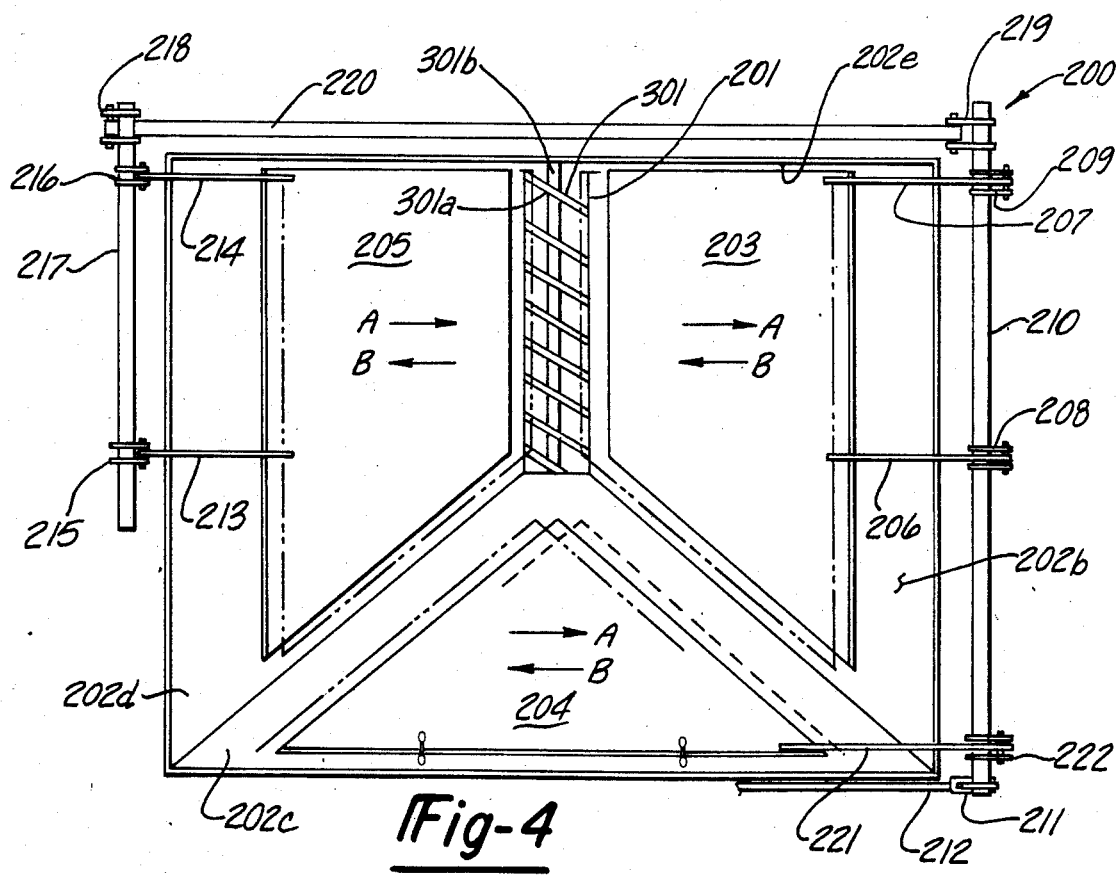
FIG. 4 is a plan view of the apparatus depicted in FIG. 3.

According to the present invention, bridging within the storage hopper assembly 200 is prevented by providing reciprocating plates 203, 204, and 205 that lie along the trapezoidal portions 202*b*, 202*c*, and 202*d* of the wall 202, respectively. The reciprocating plates 203, 204, and 205 are reciprocated in unison, by means which will subsequently be described more fully, in a first direction indicated by the arrows A in FIG. 4, and then in the reverse direction indicated by the arrows B. The stroke of the reciprocating movement in each direction is typically of the order of 1 5/6 inches for use in the processing of wood chips, and reciprocating movement of the reciprocating plates 203, 204, and 205 of this order of magnitude has been found to be quite effective in preventing bridging or compaction of wood chips within the storage hopper assembly 200.

The reciprocating plate 203 is mounted on a spaced-apart pair of support arms 206 and 207. The support arms 206 and 207 extend through the wall 202 and are pivotally connected, respectively, to the ends of first and second links 208 and 209 which are non-pivotally attached to a common drive shaft 210. The drive shaft 210 has a third link 211 non-pivotally attached to it, and the third link 211 is pivotally connected to a rod 212 which, in turn, is connected to the cam bearing 103 of the drive assembly 100. Thus, when the drive assembly 100 is operated, the cam bearing 103 will be rotated and this will impart generally reciprocatory movement to the rod 212. The generally reciprocatory movement of the rod 212 will cause the third link 211 to oscillate to and fro, and this will cause the drive shaft 210 to rotate for a part of a revolution in a first direction and then for a part of a revolution in the opposite direction. The rotation of the drive shaft 210, as described, will cause the first and second links 208 and 209 to oscillate to and fro, and this oscillating movement of the first and second links 208 and 209 will translate into reciprocating movement of the support arms 206 and 207, and thereby into reciprocating movement of the reciprocating plate 203.

The reciprocating plate 205 is mounted on a second spaced-apart pair of support arms 213 and 214. The second spaced-apart pair of support arms 213 and 214 also extend through the wall 202 and are pivotally connected, respectively, to fourth and fifth links 215 and 216. The fourth and fifth links 215 and 216 are non-pivotally connected to a second drive shaft 217. The second drive shaft 217 has a sixth link 218, and the sixth link 218 is pivotally connected to an end of a connecting rod 220, the other end of which is pivotally connected to a seventh link 219 that is non-pivotally attached to the drive shaft 210. Thus, the rotation of the drive shaft 210, as heretofore described, will cause the seventh link 219 to oscillate to and fro, and this will result in to and fro oscillating movement of the sixth link 218 by virtue of the connection of the sixth link 218 to the seventh link 219 by means of the connecting rod 220. The to and fro oscillating movement of the sixth link 218 will cause the second drive shaft 217 to rotate for a part of a revolution in a second direction, and this will cause the fourth and fifth links 215 and 216 to oscillate to and fro. The oscillating movement of the fourth and fifth links 215 and 216 will translate into reciprocating movement of the second spaced-apart pair of support arms 213 and 214, and thereby into reciprocating movement of the reciprocating plate 205. With the structure as described, the reciprocation of the reciprocating plate 205 will inherently be in unison with the reciprocation of the reciprocating plate 203.

The reciprocating plate 204 is mounted on a support arm 221 which extends through the wall 202 and is connected to an eighth link 222. The eighth link 222 is mounted on the drive shaft 210 and will oscillate to and fro when the drive shaft 210 rotates as previously described. The oscillation of the eighth link 222 will translate into reciprocating movement of the support arm 221, and thereby into reciprocating movement of the reciprocating plate 204. With the structure as described, the reciprocation of the reciprocating plate 204 will inherently be in unison with the reciprocation of the reciprocating plates 203 and 205. By using the cam bearing 103 of the drive assembly 100 to actuate the reciprocation of the reciprocating plates 203, 204, and 205, as described, the reciprocation of the reciprocating plates 203, 204, and 205 will inherently be at a rate which is proportional to the rate at which the drive assembly permits feed material to be withdrawn from the storage hopper assembly 200.

It is to be noted that it is contemplated that the storage hopper assembly 200, as heretofore described, can be used to advantage in the storage and dispensing of a wide variety of solid and semisolid materials, and that it is not limited in its utility to the feeding of biomass or solid organic materials. Specifically, it is contemplated that the storage hopper assembly 200 can be used to advantage in the storage and dispensing of coal, various metallic and nonmetallic ores, sand, and moist cement, particularly where any such material is prone to compacting because of its moisture content or otherwise.

In the practice of the present invention it has been found that a primary oxidation chamber 400 with an internal diameter in the cylinder 402 of 30 inches is satisfactory for a heating unit to be used to produce heat at the approximate rate of up to 1,000,000 BTU/hr., and that an internal diameter of 62 inches is satisfactory for a heating unit to be used to produce heat at the approximate rate of up to 8,000,000 BTU/hr. It has also been found that the wall 402 of the primary oxidation chamber 400 of the invention can be satisfactorily formed using a 1 inch thick innermost layer 405 of the catalytic refractory, a 4 inch thick insulating layer 406 of insulating brick, and a ⅛ inch thick steel plate structural layer 407.

While the invention has been described in reference to the use of the heat produced thereby to heat water in a water tube boiler 700, the heat produced by the invention can also be used in other ways, for example, in the generation of electricity.

Having thus described the present invention by way of an exemplary embodiment, it will be apparent to those skilled in the art that many modifications may be made from the exemplary embodiment without departing from the spirit of the present invention or the scope of the claims appended hereto.

What is claimed is:

1. A storage hopper for storing solid materials and for dispensing said solid materials, said storage hopper comprising:

wall means defining a chamber that has an opening at the top for receiving said solid materials and a restricted opening at the bottom of said chamber for dispensing said solid materials, said wall means comprising:

a first portion which extends outwardly and upwardly from said restricted opening; and an opposed second portion which extends outwardly and upwardly from said restricted opening for directing said solid materials toward said restricted opening;

first reciprocable plate means lying along and substantially parallel to said first portion of said wall means;

second reciprocable plate means lying along and substantially parallel to said second portion for preventing the compaction of said solid materials as said solid materials move downwardly through said chamber from said top to said restricted opening by the reciprocation of said first reciprocable plate means and said second reciprocable plate means;

means for reciprocating said first reciprocable plate means and said second reciprocable plate means, said means for reciprocating comprising:

first support arm means attached to said first reciprocable plate means, said first support arm means extending from said first reciprocable plate means through said wall means;

oscillatable means disposed externally of said chamber, said oscillatable means further contacting said first support arm means externally of said chamber, said oscillatable means comprising a link having an end pivotally attached to said first support arm means;

means for oscillating said oscillatable means, said means for oscillating comprising a shaft non-pivotally attached to an opposite end of said link and means for rotating said shaft in a first direction and then in a reverse direction, said means for rotating said shaft in a first direction and then in a reverse direction comprising:

a second link having a first end and an opposite end, said first end of said second link being non-pivotally attached to said shaft;

a rod having a first end and an opposite end, said first end of said rod being pivotally attached to said opposite end of said second link; and means for reciprocating said rod;

rotatable screw feeding means disposed beneath said storage hopper for receiving solid materials dispensed from said chamber through said restricted opening and for conveying said solid materials away from said storage hopper by the rotation of said rotatable screw feeding means;

means for rotating said rotatable screw feeding means; and said means for reciprocating said rod comprising a cam bearing, said cam bearing being rotatable with said rotatable screw feeding means, said opposite end of said rod being attached to said cam bearing.

2. A storage hopper for storing solid materials and for dispensing said solid materials, said storage hopper comprising:

wall means defining a chamber, said chamber having an opening at the top for receiving said solid materials, said chamber further having, in a horizontal plane, a configuration of a rectangle, said wall means further having a restricted opening at the bottom of said chamber for dispensing said solid materials, said restricted opening further partly extending generally centrally between first and second opposed sides of said rectangle, said wall means further defining a first portion which extends outwardly and upwardly from said restricted opening and an opposed second portion which extends outwardly and upwardly from said restricted opening for directing said solid materials toward said restricted opening, said first portion of said wall means further extending along said first of said first and second opposed sides of said rectangle, said second portion of said wall means extending along said second of said first and second opposed sides of said rectangle;

said wall means further comprising a third portion adjacent said first portion of said wall means and said second portion of said wall means, said third portion of said wall means extending outwardly and upwardly from said restricted opening for cooperation with said first and second portion of said wall means to direct said solid materials towards said restricted opening;

first reciprocable plate means lying along and substantially parallel to said first portion of said wall means;

second reciprocable plate means lying along and substantially parallel to said second portion of said wall means;

third reciprocable plate means lying along and substantially parallel to said third portion of said wall means, said third reciprocable plate means cooperating with said first and second reciprocable plate means to prevent compaction of said solid materials as said solid materials move downwardly through said chamber from said top to said restricted opening by the reciprocation of said first, second and third reciprocable plate means; and means for reciprocating said first, second and third reciprocable plate means, said means for reciprocating said first and second reciprocable plate means reciprocating said first and second reciprocable plate means in a generally vertical direction, said means for reciprocating said third reciprocable plate means reciprocating said third reciprocable plate means in a generally horizontal direction.

3. The storage hopper according to claim 2 wherein said means for reciprocating said first reciprocable plate means and said second reciprocable plate means comprises:
- first support arm means attached to said first reciprocable plate means, said first support arm means extending from said first reciprocable plate means through said wall means;
- oscillatable means disposed externally of said chamber and contacting said first support arm means externally of said chamber, the oscillation of said oscillatable means being effective to reciprocate said first support arm means and said first reciprocable plate means; and
- means for oscillating said oscillatable means.

4. The storage hopper according to claim 3 wherein said oscillatable means comprises a link, said first support arm means being pivotally attached to said link adjacent an end of said link, and wherein said means for oscillating said link comprises:
- a shaft, said shaft being non-pivotally attached to said link adjacent the other end of said link; and
- means for rotating said shaft in a first direction and then in the reverse direction.

5. The storage hopper according to claim 4 wherein said means for rotating said shaft in a first direction and then in the reverse direction comprises:
- a second link, said shaft being non-pivotally attached to said link adjacent an end of said second link;
- a rod, an end of said rod being pivotally attached to said second link adjacent the other end of said second link; and
- means for reciprocating said rod.

6. The combination comprising:
- the storage hopper according to claim 5;
- rotatable screw feeding means disposed beneath said storage hopper for receiving solid materials dispensed from said chamber through said restricted opening and for conveying said solid materials away from said storage hopper by the rotation of said rotatable screw feeding means; and
- means for rotating said rotatable screw feeding means;

wherein said means for reciprocating said rod comprises a cam bearing that is rotatable with said rotatable screw feeding means, the other end of said rod being attached to said cam bearing.

7. The storage hopper according to claim 2 wherein said chamber, in a horizontal plane, has the configuration of a rectangle, wherein said restricted opening at least partly extends generally centrally between first and second opposed sides of said rectangle, wherein said first portion of said wall means extends along said first of said first and second sides of said rectangle and wherein said second portion of said wall means extends along said second of said first and second sides of said wall means.

8. The storage hopper according to claim 7 and further comprising:
- a third portion of said wall means, said third portion of said wall means extending between said first portion of said wall means and said second portion of said wall means, said third portion of said wall means extending outwardly and upwardly from said restricted opening for cooperating with said first portion of said wall means and said second portion of said wall means to direct said solid materials toward said restricted opening; and
- third reciprocable plate means lying along and substantially parallel to said third portion of said wall means for cooperating with said first portion of said wall means and said second portion of said wall means to prevent the compaction of said solid materials as said solid materials move downwardly through said chamber from said top to said restricted opening.

9. The storage hopper according to claim 8 and further comprising:
- means for reciprocating said third reciprocable plate means.

10. The storage hopper according to claim 9 wherein said means for reciprocating said first reciprocable plate means and said second reciprocable plate means reciprocates said first reciprocable plate means and said second reciprocable plate means in a generally vertical direction and wherein said means for reciprocating said third reciprocable plate means reciprocates said third reciprocable plate means in a generally horizontal direction.

* * * * *

UNITED STATES PATENT AND TRADEMARK OFFICE
CERTIFICATE OF CORRECTION

PATENT NO. : 4,691,846

DATED : September 8, 1987

INVENTOR(S) : Cordell et al

Page 1 of 2

It is certified that error appears in the above-identified patent and that said Letters Patent is hereby corrected as shown below:

Column 1, line 58, delete "system" and insert ---- systems ----.

Column 2, line 26, delete "the" (first occurrence) and insert ---- to ----.

Column 3, line 20, before "which" insert ---- and ----.

Column 3, line 28, delete "rials" and insert ---- rial ----.

Column 4, line 22, delete "catalyic" and insert ---- catalytic ----.

Column 5, line 10, delete "it" and insert ---- is ----.

UNITED STATES PATENT AND TRADEMARK OFFICE
CERTIFICATE OF CORRECTION

PATENT NO. : 4,691,846

DATED : September 8, 1987

INVENTOR(S) : Cordell et al

It is certified that error appears in the above-identified patent and that said Letters Patent is hereby corrected as shown below:

Column 5, line 65, delete "11/4 or 11/2" and insert ---- 1¼ or 1½ ----.

Column 8, line 47, delete "301" and insert ---- 301b ----.

Column 8, line 52, delete "torque limiting" and insert ---- torque-limiting ----.

Signed and Sealed this

Ninth Day of August, 1988

Attest:

DONALD J. QUIGG

*Attesting Officer*   *Commissioner of Patents and Trademarks*